(12) United States Patent
Shimizu et al.

(10) Patent No.: US 8,623,933 B2
(45) Date of Patent: Jan. 7, 2014

(54) PROCESS FOR PRODUCING POLYETHER POLYOL AND PROCESS FOR PRODUCING RIGID FOAMED SYNTHETIC RESIN USING SAME

(75) Inventors: Katsuhiko Shimizu, Tokyo (JP); Tomohiro Hayashi, Tokyo (JP); Hiroshi Wada, Tokyo (JP); Yoshinori Toyota, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 30 days.

(21) Appl. No.: 13/326,998

(22) Filed: Dec. 15, 2011

(65) Prior Publication Data

US 2012/0088851 A1 Apr. 12, 2012

Related U.S. Application Data

(63) Continuation of application No. PCT/JP2010/060058, filed on Jun. 14, 2010.

(30) Foreign Application Priority Data

Jun. 16, 2009 (JP) ................................ 2009-143114

(51) Int. Cl.
| | |
|---|---|
| *C08G 18/50* | (2006.01) |
| *C08J 9/04* | (2006.01) |
| *C08J 9/08* | (2006.01) |
| *C07C 213/00* | (2006.01) |
| *C07C 213/06* | (2006.01) |

(52) U.S. Cl.
USPC ........... 521/167; 521/130; 521/137; 521/164; 521/174; 568/583; 568/584; 568/587

(58) Field of Classification Search
USPC .......... 568/583, 584, 587; 521/130, 137, 164, 521/167, 174
See application file for complete search history.

(56) References Cited

U.S. PATENT DOCUMENTS

| 3,297,597 A | * | 1/1967 | Edwards et al. ............... 521/166 |
| 4,383,102 A | * | 5/1983 | McDaniel et al. ............ 528/107 |
| 4,654,376 A | * | 3/1987 | Brennan et al. ............... 521/167 |
| 4,883,826 A | * | 11/1989 | Marugg et al. ................ 521/164 |
| 5,120,815 A | | 6/1992 | Marugg et al. |
| 6,281,393 B1 | | 8/2001 | Molina et al. |

FOREIGN PATENT DOCUMENTS

| JP | 03-121113 | 5/1991 |
| JP | 08-301820 | 11/1996 |
| JP | 11-189645 | 7/1999 |
| JP | 2002-524630 | 8/2002 |
| JP | 2004-010812 | 1/2004 |
| JP | 2004-137492 | 5/2004 |
| JP | 2008-133467 | 6/2008 |

OTHER PUBLICATIONS

International Search Report issued Sep. 21, 2010 in PCT/JP2010/060058 filed Jun. 14, 2010.

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

A process for producing a polyether polyol which can form low viscosity rigid foamed synthetic resins excellent in strength, dimensional stability and flame retardancy, can give a low viscosity polyol system solution containing water instead of HFCs as a blowing agent with good miscibility with isocyanate compounds and can form good rigid foamed synthetic resins by spraying, which polyether polyol is produced by reacting a phenol component (molar ratio 1) selected from phenol and phenol derivatives having a hydrogen atom at one or more ortho-positions to the phenolic hydroxyl group, an aldehyde component (molar ratio 0.3 to 0.9) selected from formaldehyde and acetoaldehyde and an alkanolamine component (molar ratio 1.5 to 3.5) selected from monoethanolamine, diethanolamine and 1-amino-2-propanol and then adding an alkylene oxide to the resulting reaction product.

14 Claims, No Drawings

PROCESS FOR PRODUCING POLYETHER POLYOL AND PROCESS FOR PRODUCING RIGID FOAMED SYNTHETIC RESIN USING SAME

TECHNICAL FIELD

The present invention relates to a process for producing a polyether polyol and a process for producing a rigid foamed synthetic resin.

BACKGROUND ART

Rigid polyurethane foams and rigid polyisocyanurate foams (hereinafter collectively referred to as "rigid foamed synthetic resins") are widely produced by reacting a polyol component with a polyisocyanate component in the presence of a foam stabilizer, a catalyst and a blowing agent. By virtues of their good heat insulating properties and molding versatility, rigid foamed synthetic resins are suitably used as heat insulators for various apparatus and buildings. These rigid foamed synthetic resins are produced by spraying, slab stock molding, injection molding or other molding methods.

For example, spraying is mostly employed to produce rigid foamed synthetic resins as heat insulators at construction sites. In spraying, a polyol system solution containing a polyol, a blowing agent and the like and a polyisocyanate compound are pumped separately and sprayed from a spray gun onto walls and other surfaces so that they react to form a foam on them. An advantage of spraying is that walls and other surfaces of any shape can be covered with insulators of a desired thickness. Among the spraying techniques, multi-layer spraying can form a thick heat insulating barrier with good heat insulating properties by spraying a rigid foamed synthetic resin twice or more in layers.

In general, rigid foamed synthetic resins having lower densities are desired because they would be produced from smaller amounts of raw materials and, hence, at lower cost and they would be light enough to be transported easily. However, as the density decreases, they develop a problem with dimensional stability and become mechanically weak and likely to shrink. Therefore, it is necessary to develop low density rigid foamed synthetic resins with excellent mechanical strength and dimensional stability.

From the standpoint of fire prevention, as a building material, rigid foamed synthetic resins are required to have flame retardancy. Especially, when they are formed by spraying, flame retardancy is required in order to prevent welding sparks at construction sites from starting a fire.

At present, for production of rigid foamed synthetic resins, as blowing agents, hydrofluorocarbons (such as HFC-245fa, HFC-365mfc, hereinafter referred to as HFCs) are mainly used. However, considering their adverse impact on the environment, it is desired to reduce the use of HFCs. Therefore, techniques for reducing the use of HFCs have been explored by using water as a blowing agent to compensate for the reduction of HFCs. However, because the foam density attained with a HFC can be attained with much less water, there is a problem that if water is used instead of an HFC at the sacrifice of the solvency of the HFC, a polyol, a blowing agent, a foam stabilizer, a catalyst and other necessary additives form a viscous polyol system solution which adversely affects moldability and workability.

Besides, there is another problem that as the water content in the polyol system solution increases, the polyol system solution becomes less miscible with a highly hydrophobic polyisocyanate compound, and molding defects tend to occur. Especially, the above-mentioned problems with the use of water as a blowing agent are remarkable in spray molding, and there is a strong demand that these problems be solved at the same time as achievement of long-sought reduction of densities of rigid foamed synthetic resins and better flame retardancy.

Meanwhile, polyether polyols obtained from the products of Mannich condensation reaction of phenols, aldehydes and alkanolamines are advantageous in terms of mechanical strength and flame retardancy and highly evaluated.

Patent Documents 1 to 5 mentioned below disclose Mannich polyols obtained by using Mannnich condensation products from phenols, aldehydes and alkanolamines.

Patent Document 1 relates to a process for producing a rigid polyurethane foam using water as a blowing agent and discloses that it is preferred to react a phenol, an aldehyde and an alkanolamine in a phenol:aldehyde ratio of from 1:1 to 1:2.2.

Patent Document 2 discloses a Mannich polyol obtained by addition of an alkylene oxide to a Mannich condensation product with a high functionality obtained by mixing 1 mol of a phenol with from 1 to 2 mol of an amine compound and then adding from 1.25 to 1.75 mol of formaldehyde.

Patent Document 3 relates to a process for producing a rigid foamed synthetic resin and discloses a low-viscosity Mannich polyol obtained from a Mannich condensation product with high functionality obtained by condensing an alkylphenol, diethanolamine and formaldehyde in a ratio of 1:2.5-4:1.5-2.

Patent Document 4 relates to a process for producing a Mannich polyol by reacting a phenolic compound, formaldehyde and an alkanolamine and dehydrating the resulting Mannich condensation product at least partially and alkylating the dehydration product and discloses that the phenolic compound and formaldehyde are used preferably in a molar ratio of 1:0.9-3.5.

Patent Document 5 relates to a process for producing a polyether polyol by adding propylene oxide and/or butylene oxide (but no ethylene oxide) to the reaction product of a phenol, an aldehyde and an alkanolamine and discloses that the aldehyde is used in an amount of from 1.35 to 3.0 mol in relation to 1 mol of the phenol.

PRIOR ART DOCUMENTS

Patent Document(s)

Patent Document 1: JP-A-2002-524630
Patent Document 2: JP-A-2004-10812
Patent Document 3: JP-A-08-301820
Patent Document 4: JP-A-03-121113
Patent Document 5: JP-A-11-189645

DISCLOSURE OF INVENTION

Technical Problem

However, Mannich polyols obtained by conventional processes tend to have high viscosities and form viscous polyol system solutions. Viscous polyol system solutions has a problem that they do not mix well with polyisocyanate compounds as raw materials at the time of foaming and impair workability, and solution to the problem is strongly demanded.

The present invention was made under the above circumstances and aims to provide a process for producing a polyether polyol which can form low density rigid foamed synthetic resins excellent in strength, dimensional stability and flame retardancy, can give a low viscosity polyol system solution containing water instead of HFCs as a blowing agent with good miscibility with polyisocyanate compounds and can form good rigid foamed synthetic resins by spraying, and a process for producing a rigid foamed synthetic resin using the polyether polyol.

Solution to Problem

The present invention provide the following [1] to [9].
[1] A process for producing a polyether polyol (A) by reacting the following phenol component, the following aldehyde component and the following alkanolamine component and adding an alkylene oxide to the resulting reaction product, wherein the aldehyde component is used in an amount of at least 0.3 mol and less than 0.9 mol, and the alkanolamine component is used in an amount of at least 1.5 mol and at most 3.5 mol, in relation to 1 mol of the phenol component:

Phenol component: at least one member selected from the group consisting of phenol and phenol derivatives having a hydrogen atom at one or more ortho-positions to the phenolic hydroxyl group;

Aldehyde component: at least one member selected from the group consisting of formaldehyde and acetoaldehyde;

Alkanolamine component: at least one member selected from the group consisting of monoethanolamine, diethanolamine and 1-amino-2-propanol.
[2] The process for producing a polyether polyol (A) according to [1], wherein the phenol component is at least one member selected from alkylphenols having a hydrogen atom at one or more ortho-positions to the phenolic hydroxyl group and at least one aromatic hydrogen atom substituted by a $C_{1-15}$ alkyl group.
[3] The process for producing a polyether polyol (A) according to [1] or [2], wherein the alkylene oxide is at least one member selected from ethylene oxide, propylene oxide and butylenes oxide.
[4] The process for producing a polyether polyol (A) according to [1] to [3], wherein the polyether polyol (A) has a hydroxyl value of from 200 to 800 mgKOH/g.
[5] A process for producing a rigid foamed synthetic resin by reacting a polyol composition (P), a polyisocyanate compound (I) in the presence of a blowing agent, a foam stabilizer and a catalyst, which is characterized in that the polyol composition (P) comprises a polyether polyol (A) obtained by the process as defined in [1] to [4].
[6] The process for producing a rigid foamed synthetic resin according to [5], wherein water is used solely as the blowing agent.
[7] The process for producing a rigid foamed synthetic resin according to [5] or [6], wherein the polyol composition (P) contains a polymer-dispersed polyol (W).
[8] The process for producing a rigid foamed synthetic resin according to [7], wherein the polymer-dispersed polyol (W) has a hydroxyl value of from 100 to 800 mgKOH/g.
[9] The process for producing a rigid foamed synthetic resin according to [5] to [8], wherein spraying is used.

Advantageous Effect(s) of Invention

The polyether polyol (A) obtained by the process of the present invention can give low-density rigid foamed synthetic resins excellent in strength, dimensional stability and flame retardancy when used for production of rigid formed synthetic resins.

The polyether polyol (A) can give a low viscosity polyol system solution miscible with polyisocyanate compounds, even when water is used as a blowing agent instead of HFCs, and hence contributes to good moldability and workability and enables formation of good rigid foamed synthetic resins by spraying.

DESCRIPTION OF EMBODIMENT(S)

In the present invention, "polyol system solution" means a solution to be reacted with a polyisocyanate compound and contains a blowing agent, a foam stabilizer, a catalyst and other necessary additives, in addition of a polyol.

In the present invention, "rigid foamed synthetic resin" is a generic name for rigid polyurethane foams and rigid polyisocyanurate foams and is sometimes referred to as rigid foam hereinafter.

In the present invention, "polymer-dispersed polyol" is a polyol (W) obtained by polymerizing a monomer having a polymerizable unsaturated bond in a base polyol (W') such as a polyether polyol or a polyester polyol to form polymer particles therein and is a dispersion of the polymer particles in the base polyol (W').

In the present invention, "Mannich condensation product" is a compound obtained by reacting a phenol component, an aldehyde component and an alkanolamine component.

In the present invention, "Mannich polyol" is a compound obtained by adding an alkylene oxide to a Mannich condensation product.

<Production of Polyether Polyol (A)>

The process for producing a polyether polyol (A) of the present invention starts with reaction of a phenol component, an aldehyde component and an alkanolamine component (hereinafter sometimes also referred to as Mannich condensation reaction) to obtain a reaction product containing a Mannich condensation product. The reaction product is supposed to contain unreacted reactants remaining after the reaction.

The phenol component is at least one member selected from the group consisting of phenol and phenol derivatives having a hydrogen atom at least one ortho-position to the phenolic hydroxyl group. Namely, it is required only to have a hydrogen atom at least one ortho-position to the phenolic hydroxyl group and may be phenol or a phenol derivative. The phenol component may be a single species or a combination of two or more species As phenol derivatives, alkylphenols having a hydrogen atom at one or more ortho-positions to the phenolic hydroxyl group and having at least one $C_{1-15}$ alkyl group in place of at least one of the other hydrogen atoms. The alkyl group(s) may be present at the ortho-, meta- or para-position. The alkylphenols have from 1 to 4 alkyl groups, preferably from 1 to 2 alkyl groups, particularly preferably one alkyl group, instead of hydrogen atoms.

The alkyl groups in the alkylphenols preferably have from 1 to 10 carbon atoms. As the alkylphenols, nonylphenol and cresol are preferably used. Nonylphenol is particularly preferred in view of improvement of the miscibility of the polyol (A) with the polyisocyanate compound (I) and better cell appearance.

As the aldehyde component, formaldehyde, acetaldehyde or a mixture of them is used. Among them, formaldehyde is preferred in view of improvement of the adhesiveness of the rigid foam. Formaldehyde may be used in any form such as an aqueous formalin solution, a methanol solution and paraformaldehyde. When paraformaldehyde is used, it may be heated to produce formaldehyde, and the formaldehyde may be used for the reaction in this step, and the molar amount of paraformaldehyde to be used is calculated in terms of formaldehyde.

The alkanolamine component is at least one member selected from the group consisting of monoethanolamine, diethanolamine and 1-amino-2-propanol. Among them, diethanolamine is particularly preferred in view of the balance between improving the strength of the resulting rigid foam and lowering the viscosity of the polyol (A).

In the present invention, as to the proportion of the raw materials, at least 0.3 mol and less than 0.9 mol, preferably at least 0.4 mol and less than 0.85 mol, particularly preferably at least 0.4 mol and less than 0.8 mol, of the aldehyde component is used in relation to 1 mol of the phenol component. If the aldehyde component is at least 0.3 mol, the resulting rigid foam tends to have good dimensional stability. If the aldehyde component is less than 0.9 mol, the resulting polyol (A) tends to have a low viscosity and hence is easily miscible with the polyisocyanate compound (I).

The alkanloamine is used in an amount of from 1.5 to 3.5 mol, preferably from 2 to 3.5 mol, in relation to 1 mol of the phenol component. It is preferred that the amount is within the range of from 1.5 to 3.5 mol, because a low-viscosity polyol system solution which is easily miscible with the polyisocyanate compound (I) tends to be obtained, and a rigid foam with better dimensional stability and frame retardancy can be obtained.

In the present invention, the contribution of the proportion of the aldehyde component to the low viscosity of the polyol (A) is supposed to be large for the following reason. The reason will be explained in reference to an alkylphenol having an alkyl group R at the para-position as the phenol component, formaldehyde as the aldehyde component and diethanolamine as the alkanolamine component, but applies to other compounds.

When less than 0.9 mol of the aldehyde component is used in relation of 1 mol of the phenol component in the reaction of the phenol component, the aldehyde component and the alkanolamine component, the Mannich condensation product represented by the formula (i) from the 1:1 (molar ratio) reaction of the phenol component and the aldehyde component is more likely to form than the Mannich condensation product represented by the following formula (iii) from the 1:2 (molar ratio) reaction of the phenol component and the aldehyde component and the polycyclic compound represented by the formula (iv), and the unreacted alkylphenol represented by the formula (ii) is likely to remain. In the formula (iv), n is an integer of from 1 to 3.

The compound represented by the formula (i) is less likely to give a Mannich polyol having a high viscosity than the compound represented by the formula (iii) or (iv). The presence of the unreacted phenol compound represented by the formula (ii) lowers the viscosity of the resulting Mannich polyol (the polyol (A)).

Therefore, use of less than 0.9 mol of the aldehyde component in relation of 1 mol of the phenol component lowers the viscosity of the resulting polyol (A) and hence the viscosity of the polyol system solution containing the polyol (A).

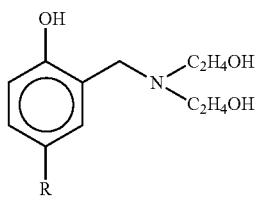

(i)

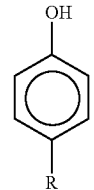

(ii)

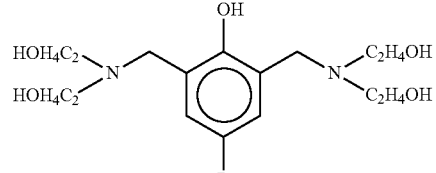

(iii)

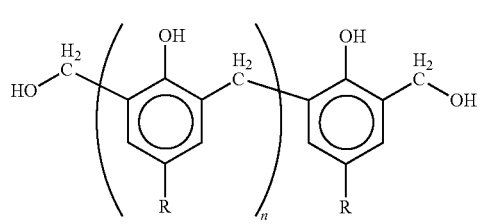

(iv)

The Mannich condensation reaction in the present invention can be carried out by known methods, and preferably by mixing the phenol component, the aldehyde component and the alkanolamine component and heating the mixture at from 50 to 150° C., preferably at from 80 to 130° C. They can be mixed by the following methods (1) to (3).

(1) Mix the phenol component, the aldehyde component and the alkanolamine component all at once;
(2) Add the aldehyde component to a mixture of the phenol component and the alkanolamine component;
(3) Add the phenol component to a mixture of the aldehyde component and the alkanolamine component.

The method (2) is the best because polycyclic compounds are hardly formed, and the second best is the method (3).

It is preferred to remove the water produced by the Mannich condensation reaction or attributed to use of an aqueous formalin solution from the reaction product by an appropriate method, for example, to a residual water content of about 1 mass % by vacuum dehydration at an internal pressure of the reactor of 10-500 mmHg at 100 to 150° C. Water may be removed before or after the addition of an alkylene oxide, but preferably before the addition of an alkylene oxide.

In the present invention, the polyether polyol (A) is obtained by adding an alkylene oxide to the Mannich condensation product as the initiator (S1).

It is preferred to add from 2 to 30 mol, particularly from 4 to 20 mol, of an alkylene oxide to the initiator (S1) in relation to 1 mol of the phenol component used in the Mannich condensation reaction. When the alkylene oxide is added in an amount of at least 2 mol, the resulting polyol (A) tends to have a low hydroxyl value and a low viscosity. When the alkylene oxide is added in an amount of less than 30 mol, rigid foams obtained by using the resulting polyol (A) are unlikely to shrink.

The alkylene oxide (sometimes referred to as AO) used for the ring-opening addition polymerization to the initiator (S1) is at least one member selected from ethylene oxide (sometimes referred to as EO), propylene oxide (sometimes referred to as PO) and butylenes oxide. Among them, it is preferred to use EO and/or PO, particularly EO and PO.

When PO and EO are used in combination, they may be polymerized in blocks or randomly or block polymerization and random polymerization may be combined. In the case of block polymerization, the AOs are subjected to ring-opening addition polymerization preferably in the order PO, EO, or in the order EO, PO, EO. Ring-opening addition polymerization in this order is preferred because a polyol (A) having primary hydroxyl groups as predominant hydroxyl groups which is highly reactive with the polyisocyanate compound (I) can be obtained, and hence, a rigid foam with better appearance can be obtained. In addition, the adhesiveness of the resulting rigid foam improves.

The ratio (EO+PO)/AO of the sum of EO and PO to the AOs subjected to the ring-opening addition polymerization to the initiator (S1) is preferable from 50 to 100 mass %, particularly from 80 to 100 mass %, particularly preferably 100 mass %. When the ratio is within this range, it is possible to keep down the viscosity of the polyol and easily secure the mechanical strength of the resulting rigid foam.

The ratio EO/(EO+PO) of EO to the sum of EO and PO is preferably from 50 to 100 mass %, particularly preferably from 50 to 80 mass %. When the ratio is within this range, it is possible to keep down the viscosity of the polyol and easily secure the mechanical strength of the resulting rigid foam. Especially, it is preferred that the polyol is capped with ethylene oxide, because it has terminal primary hydroxyl groups and hence is active enough to react rapidly to cause foaming.

When the polyol (A) consists of two or more species, the (EO+PO)/AO ratio and the EO/(EO+PO) ratio mentioned above means those in the whole polyol (A).

The polyol (A) preferably has a hydroxyl value of from 200 to 800 mgKOH/g, particularly from 200 to 550 mgKOH/g, particularly preferably from 250 to 450 mgKOH/g. As the polyol (A), two or more species may be used in combination, as long as each species has a hydroxyl value within the above-mentioned range.

It is preferred that the hydroxyl value of the polyol (A) is below the lower limit of the above-mentioned range, because the content of the oxyalkylene chain derived from the alkylene oxides in the polyol (A) increases, and hence the polyol (A) tends to have a lower viscosity. Further, a less brittle and more adhesive rigid foam is obtained. On the other hand, it is preferred that the hydroxyl value of the polyol (A) is above the lower limit of the above-mentioned range, it is possible to secure the mechanical strength of the resulting rigid foam and improve the dimensional stability.

The process for producing a polyol (A) of the present invention can give a polyol (A) having a viscosity of at most 800 mPa·s, preferably at most 600 mPa·s, more preferably at most 500 mPa·s at 25° C.

There is no particular restriction on the lower limit of the viscosity, but it is preferably at least 200 mPa·s, particularly preferably at least 300 mPa·s in order to secure the mechanical strength of the rigid foam.

<Production of a Rigid Foamed Synthetic Resin>

The process for producing a rigid foamed synthetic resin according to the present invention comprises a reaction and foaming step of reacting a polyol composition (P) with a polyisocyanate compound (I) in the presence of a blowing agent, a foam stabilizer and a catalyst.

[Polyol Composition (P)]

The polyol composition (P) (hereinafter also referred to simply as the composition (P)) comprises the polyol (A). The content of the polyol (A) in the composition (P) is preferably from 20 to 100 mass %, more preferably from 30 to 99 mass %, particularly preferably from 30 to 60 mass %. When the content is within this range, the resulting foam has favorable mechanical strength, heat resistance and flame retardancy, and cracking of the foam can be prevented. It also shows a good activity in spraying, and a heat insulating barrier with a uniform thickness can be formed on a wall by spraying with good workability. Further, in the case of multilayer spraying, since foam layers adhere to one another well, good workability is attained.

[Polyol (C)]

The composition (P) may further contain a polyester polyol (C) (hereinafter referred to also as poylol (C)) having a hydroxyl value of from 100 to 400 mgKOH/g obtained by polycondensation of a polycarboxylic acid and a polyhydric alcohol.

It is preferred that at least one of the polycarboxylic acid and the polyhydric alcohol to be polycondensed is an aromatic compound having an aromatic ring.

As the polycarboxylic acid, a dicarboxylic acid or the anhydride thereof is preferred. As dicarboxylic acids having an aromatic ring, phthalic acids such as terephthalic acid may be mentioned. As dicarboxylic acids having no aromatic ring, maleic acid, fumaric acid, adipic acid and the like may be mentioned.

As the polyhydric alcohol, a diol is preferred. As diols having an aromatic ring, a diol obtained by adding EO to bisphenol A and the like may be mentioned. As diols having no aromatic ring, ethylene glycol, diethylene glycol, polyethylene glycol and the like may, for example, be mentioned.

The polyol (C) has a hydroxyl value of from 100 to 500 mgKOH/g, preferably from 100 to 400 mgKOH/g, more preferably from 100 to 350 mgKOH/g.

As the polyol (C), two or more species may be used in combination, as long as each species has a hydroxyl value within the above-mentioned range.

It is preferred that the hydroxyl value of the polyol (C) is below the upper limit of the above-mentioned range, because the resulting form is less brittle and more adhesive, and the polyol (C) tends to have a low viscosity and hence mixes well in the composition (P). Further, a high isocyanate index can be set when the polyol system solution and the polyisocyanate compound (I) are used in a predetermined volume ratio in spraying. On the other hand, when the hydroxyl value of the polyol (C) is above the lower limit of the above-mentioned range, the resulting foam is unlikely to shrink. Namely, when the hydroxyl value is within the above-mentioned range, the raw material mix well, and a rigid foam having a high adhesive strength, especially a high initial adhesive strength, can be obtained.

When the composition (P) contains the polyol (C), the content of the polyol (C) is preferably from 1 to 80 mass %, more preferably from 10 to 70 mass %, based on the composition (P). When the content is within the range, the strength and adhesiveness of the resulting foam sufficiently improve.

[Polymer-Dispersed Polyol (W)]

It is preferred that the composition (P) contains polymer particles. The polymer particles are preferred to be dispersed in the composition (P), and specifically speaking, it is preferred to prepare a polymer-dispersed polyol (W) having polymer particles dispersed in a base polyol (W') and incorporate the polymer-dispersed polyol (W) in the composition (P).

The polymer-dispersed polyol (W) may be a single species or a combination of two or more species.

The polymer particles preferably have an outer diameter of at most 10 μm, when measured with a Microtrack ultrafine particle size analyzer UPA-EX150 manufactured by Nikkiso.

The content of polymer particles in the composition (P) is preferably from 0.002 to 10 mass %, more preferably from 0.02 to 10 mass %, particularly preferably from 0.5 to 7 mass %. When the content is within the above-mentioned range, it is possible to maintain the heat insulating properties while preventing the shrinkage of the resulting rigid foam.

The hydroxyl value of the polymer-dispersed polyol (W) is preferably from 100 to 800 mgKOH/g, more preferably from 150 to 800 mgKOH/g. Herein, the hydroxyl value of the polymer-dispersed polyol (W) is obtained by measuring the hydroxyl value of the dispersion of polymer particles in the base polyol (W').

When the hydroxyl value of the polymer-dispersed polyol (W) is above the lower limit of the above-mentioned range, the polyol is miscible with the other polyols, and when it is below the upper limit of the above-mentioned range, the polymer particles are dispersed stably.

The polymer-dispersed polyol (W) is prepared by polymerizing a monomer having a polymerizable unsaturated bond into particles in the base polyol (W'), if necessary in the presence of a solvent.

The monomer having a polymerizable unsaturated bond to be used for formation of the polymer particles is usually a monomer having one polymerizable unsaturated bond, but is not limited thereto.

Specific examples of the monomer include cyano group-containing monomers such as acrylonitrile, methacrylonitrile, 2,4-dicyanobutene-1; styrene monomers such as styrene, α-methylstyrene and halogenated styrenes; acrylic monomers such as acrylic acid, methacrylic acid and alkyl esters thereof and acrylamide and methacrylamide; vinyl ester monomers such as vinyl acetate and vinyl propionate; diene monomers such as isoprene, butadiene and other diene monomers; unsaturated fatty acid esters such as maleic acid diesters and itaconic acid diesters; vinyl halides such as vinyl chloride, vinyl bromide and vinyl fluoride; vinylidene halides such as vinylidene chloride, vinylidene bromide and vinylidene fluoride; vinyl ether monomers such as methyl vinyl ether, ethyl vinyl ether and isopropyl vinyl ether; and other olefins and halogenated olefins.

The combination of from 20 to 90 mass % of acrylonitrile and from 10 to 80 mass % of another monomer is preferred, and as such another monomer, styrene, an alkyl acrylate, an alkyl methacrylate or vinyl acetate is preferred. Such other monomers may be used in combination of two or more of them.

In addition to the above-mentioned monomers, a fluorinated acrylate or a fluorinated methacrylate (hereinafter sometimes referred to as "a fluorinated monomer") is preferably used as part of the monomer having a polymerizable unsaturated bond. Use of such a fluorinated monomer allows the polymer particles to disperse in the base polyol (W') more stably and improves miscibility of the polymer-dispersed polyol (W) with the other polyols, and therefore, is expected to improve the dimensional stability and heat insulating properties of the resulting rigid foam.

As a suitable fluorinated monomer, a monomer represented by the following formula (1) may be mentioned:

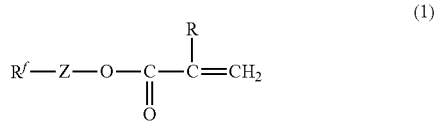

(1)

wherein $R^f$ is a $C_{1-18}$ polyfluoroalkyl group. The number of carbon atoms in $R^f$ is from 1 to 18, preferably from 1 to 10, more preferably from 3 to 8.

$R^f$ is preferably such that the proportion of fluorine atoms in the alkyl group (the proportion of the number of hydrogen atoms substituted by fluorine atoms in the alkyl group) is preferably at least 80%, and it is particularly preferred that all hydrogen atoms are substituted by fluorine atoms. When the number of carbon atoms is at most 18, the stability of a foam will be good at the time of foaming in the production of a rigid polyurethane foam.

R is a hydrogen atom or a methyl group.

Z is a bivalent linking group having no fluorine atoms and is preferably a hydrocarbon group, and may, for example, be an alkylene group or an arylene group, more preferably an alkylene group. The alkylene group is preferably a $C_{1-10}$ alkylene group, particularly preferably a $C_{1-5}$ alkylene group, and it may be linear or branched. Here, Z and $R^f$ are delimited so that $R^f$ has fewer carbon atoms.

Specific examples of the monomer represented by the above formula (1) include the compounds represented by the following formulae (1-1) to (1-3).

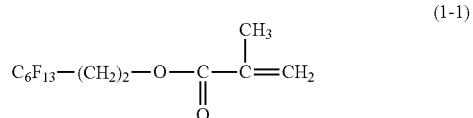

(1-1)

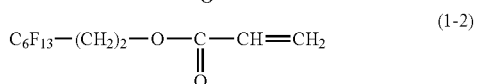

(1-2)

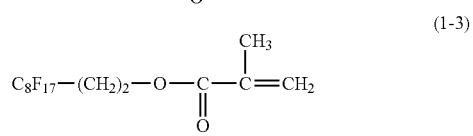

(1-3)

Such fluorinated monomers may be used singly or in combination of at least two.

When a fluorinated monomer is used, its amount is preferably from 10 to 100 mass %, more preferably from 30 to 80 mass %, based on the entire monomer having a polymerizable unsaturated group.

Especially, when a monomer presented by the formula (1) is used, its amount if preferably from 20 to 100 mass %, more preferably from 30 to 60 mass %, most preferably from 40 to 60 mass %, based on the entire monomer having a polymerizable unsaturated group.

When the proportion of the monomer represented by the above formula (1) is at least 20 mass %, particularly at least 30 mass %, good heat-insulating properties can be obtained when a rigid polyurethane foam is formed.

When a fluorinated monomer is used, in addition of the above-mentioned monomer having a polymerizable unsaturated bond, a macro monomer may be used in combination. A "macro monomer" means a low molecular weight polymer or oligomer having a radical polymerizable unsaturated bond at one terminal.

The total amount of monomers having a polymerizable unsaturated bond to be used for formation of polymer particles is not particularly restricted, but is preferably such that the content of polymer particles in the polymer-dispersed polyol (W) is from 1 to 50 mass %, more preferably from 2 to 45 mass %, still further preferably from 10 to 30 mass %.

For polymerization of monomers having a polymerizable unsaturated group, a polymerization initiator which generates a free radical to initiate the polymerization is preferably used. As specific examples of the polymerization initiator, 2,2-azobis-isobutyronitrile (AIBN), 2,2-azobis-2-methylbutyronitrile (AMBN), 2,2-azobis-2,4-dimethylvaleronitrile, benzoyl peroxide, diisopropyl peroxydicarbonate, acetyl peroxide, di-tert-butyl peroxide, persulfates and the like may be mentioned. AMBN is particularly preferred.

The base polyol (W') may, for example, be a polyetherpolyol, a polyester polyol or a hydrocarbon polymer having hydroxyl groups at its terminals and so on. It is preferably composed solely of a polyetherpolyol, or is a combination of a polyether polyol as the main component and a small amount of a polyester polyol, a hydrocarbon polymer having hydroxyl groups at its terminals or the like.

The polyetherpolyol may, for example, be a polyetherpolyol obtainable by ring-opening addition polymerization of a cyclic ether such as an alkylene oxide to an initiator such as a polyhydroxy compound such as a polyhydric alcohol or a polyhydric phenol, or an amine. As the based polyol (W'), the same polyether polyol as the polyol (A) may be used, or the same polyester polyol as the polyol (C) may be used.

It is preferred that the following polyether polyol (X) accounts for at least 5 mass % of the base polyol (W'). The polyether polyol (X) is a polyether polyol having a hydroxyl value of at most 84 mgKOH/g and having an oxyethylene group content of at least 40 mass % in the entire polyether polyol (X).

The polyetherpolyol (X) is preferably a polyetherpolyol obtainable by using a polyhydric alcohol as an initiator and ring-opening addition polymerization of ethylene oxide, or ethylene oxide and another cyclic ether, thereto.

The polyhydric alcohol is preferably glycerol, trimethylolpropane or 1,2,6-hexanetriol. Another cyclic ether is preferably PO, isobutylene oxide, 1-butene oxide or 2-butene oxide, and PO is particularly preferred.

By using the polyetherpolyol (X) having an average hydroxyl value of at most 84 mgKOH/g, it becomes possible to easily obtain a polymer-dispersed polyol (W) in which polymer particles are stably dispersed. The average hydroxyl value of the polyether polyol (X) is preferably at most 67 mgKOH/g, particularly preferably at most 60 mgKOH/g. From the viewpoint of the dispersion stability of the fine polymer particles, the lower limit of the hydroxyl value of the polyetherpolyol (X) is preferably at least 5 mgKOH/g, more preferably at least 8 mgKOH/g, further preferably at least 20 mgKOH/g, particularly preferably at least 30 mgKOH/g.

When the oxyethylene group content in the entire polyether polyol (X) is at least 40 mass %, the dispersability of the polymer particles in the polymer-dispersed polyol (Z) can easily be achieved. The oxyethylene group content is preferably at least 50 mass %, further preferably at least 55 mass %. The oxyethylene group content may be about 100 mass %. That is, it may be a polyetherpolyol (X) obtained by adding only ethylene oxide to the initiator. From the viewpoint of the dispersion stability of the polymer particles, the oxyethylene group content is preferably at most 90 mass %.

when the content of the polyether polyol (X) in the base polyol (W') is at least 5 mass %, a polymer-dispersed polyol (W) having good dispersability can easily be obtained. The content of the polyether polyol (X) is more preferably at least 10 mass %. There is no particular upper limit for the content of the polyetherpolyol (X, but it is preferably set so that the average hydroxyl value of the polymer-dispersed polyol (W) will be within the above-mentioned preferred range.

The base polyol (W') is preferably a mixture of from 5 to 90 mass % of the polyether polyol (X) and from 10 to 95 mass % of a polyol (Z) having an average hydroxyl value of from 400 to 850 mgKOH/g, more preferably a mixture of from 30 to 80 mass % of the polyetherpolyol (X) and from 20 to 70 mass % of the polyol (Z).

The hydroxyl value of the polyol (Z) is more preferably from 400 to 800 mgKOH/g.

The polyol (Z) may, for example, be one having a hydroxyl value within the above-mentioned range among the polyols mentioned for the above base polyol (W') and is preferably a polyether polyol obtainable by adding PO to an initiator such as a polyhydric alcohol or amine.

When the polymer-dispersed polyol (W) is incorporated in the composition (P), its content is set so that the content of the polymer particles in the entire composition (P) falls within the above-mentioned preferred range. For example, the content of the polymer-dispersed polyol (W) in the entire composition (P) is preferably within the range of from 0.01 to 20 mass %, more preferably from 0.1 to 20 mass %.

[Other Polyols (D)]

The composition (P) may contain other polyols (D) which are not included in any one of the polyol (A), the polyol (C) and the polymer-dispersed polyol (W).

Such polyols (D) may, for example, be a polyether polyol, a polyester polyol, a polycarbonate polyol, an acryl polyol or the like. The hydroxyl value of such a polyol (D) is preferably from 10 to 600 mgKOH/g. Two or more polyols may be used in combination as long as the hydroxyl value of each polyol is within the above-mentioned range.

The content of the polyol (D) in the entire composition (P) is preferably at most 25 mass %, more preferably at most 20 mass %.

The overall hydroxyl value of the composition (P) is preferably from 100 to 450 mgKOH/G, more preferably from 150 to 350 mgKOH/g. When the hydroxyl value of the composition (P) is within the above-mentioned range, the resulting rigid foam favorably has sufficient strength.

The polyol composition (P) comprises the polyol (A) and may optionally contain the polyols (C), (W) and/or (D). The composition (P) may further contain a viscosity-reducing component.

[Polyisocyanate Compound (I)]

The polyisocyanate compound (I) may, for example, be an aromatic, alicyclic or aliphatic polyisocyanate having at least two isocyanate groups; or a modified polyisocyante obtainable by modifying such a polyisocyanate.

Specific examples include polyisocyanates such as tolylene diisocyanate (TDI), diphenylmethane diisocyanate (MDI), polymethylene polyphenyl polyisocyanate (so-called crude MDI), xylylene diisocyanate (XDI), isophorone diisocyanate (IPDI) and hexamethylene diisocyanate (HMDI), and prepolymer-type modified products, sicocyanurate modified products, urea modified products and carbodiimide modified products thereof. The polyisocyanate compound (I) may be a single species or a combination of two or more species.

The polyisocyanate compound (I) is usually a liquid. The viscosity of the polyisocyantae comound (I) at 25° C. is preferably from 50 to 450 mPa·s, more preferably from 50 to 300 mPa·s. When the viscosity is within this range, the resulting foam hardly shrinks.

Besides, foams with good appearance can be obtained by spray molding with good workability. The amount of the polyisocyanate compound (I) is preferably from 50 to 300 in terms of 100 times the ratio of isocyanate groups to total active hydrogen groups from the composition (P) and the other active hydrogen compounds in the reaction system (hereinafter which is referred to as "isocyanate index").

Especially, the amount of the polyisocyanate compound (I) to be used for urethane formulations mainly using a catalyst which catalyzes the urethane-forming reaction is preferably from 50 to 170, more preferably from 70 to 150, in terms of isocyanate index.

The amount of the polyisocyanate compound (I) to be used for isocyanurate formulations mainly using a catalyst which catalyzes trimerization of isocyanate groups is preferably from 100 to 350, more preferably from 100 to 300, further preferably from 100 to 180, in terms of isocyana index.

[Catalyst]

As the catalyst, known catalysts may be used, but as a catalyst which catalyzes urethane-forming reaction, a tertiary amine is preferred, and as a catalyst which catalyzes trimerization of isocyanate groups, a metal salt other than a tin salt, a zinc salt and a mercury salt and/or a quaternary ammonium salt is preferred.

The tertiary amine may, for example, be a tertiary amine compound such as N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N,N'-dimethylpiperazine, dimethylcyclohexylamine, N-methylmorpholine, N-ethylmorpholine, bis(2-dimethylaminoethyl) ether, 1-methylimidazole, 1,2-dimethylimidazole, 1-isobutyl-2-methylimidazole, 1-dimethylaminopropylimidazole or N-methyl-N—(N,N-dimethylaminoethyl) ethanolamine, etc. Among them, bis(2-dimethylaminoethyl) ether is preferred because it hardly generates an odor.

As the metal salt other than tin, zinc and mercury salts, metal carboxylates which catalyze trimerization of isocyanate groups such as potassium acetate, potassium 2-ethylhexanoate and bismuth 1-ethylhexanoate may be used. Potassium 2-ethylhexanoate is preferred because it costs little and shows excellent catalytic activity in spray molding.

The quaternary ammonium salt may, for example, be a tetraalkylammonium halide such as tetramethylammonium chloride; a tetraalkylammonium hydroxide such as tetramethylammonium hydroxide; a tetraalkylammonium organic acid salt such as tetramethylammonium 2-ethylhexanoate, 2-hydroxypropyltrimethylammonium formate or 2-hydroxypropyltrimethylammonium 2-ethylhexanoate; or a quaternary ammonium compound obtainable by subjecting a quaternary ammonium carbonate obtainable by reacting a tertiary amine such as N,N,N',N'-tetramethylethylene diamine with a carbonate diester to an anion exchange reaction with 2-ethylhexanoic acid.

The total amount of the catalyst to be used is preferably from 0.1 to 20 parts by mass, per 100 parts by mass of the composition (P).

It is possible to adjust the time (cream time) required until the visual observation of the initiation of the reaction after mixing of the polyisocyanate (I), a blowing agent and a foam stabilizer and the time (rise time) required until termination of the reaction by adjusting the amount of the catalyst.

[Blowing Agent]

Though known blowing agents may be used, it is preferred to use water as at least part of the blowing agent, and it is preferred to use water entirely as the blowing agent.

When water is used as part of the blowing agent, water is preferably used in combination with air or an inert gas (such as carbon dioxide or nitrogen) and optionally with a low-boiling fluorinated compound or hydrocarbon compound.

The low-boiling fluorinated compound may, for example, be 1,1,1,2-tetrafluoroethane (HFC-134a), 1,1,1,3,3-pentafluoropropane (HFC-245fa),1,1,1,3,3-pentafluorobutane (HFC-365mfc), 1,1,2,2-tetrafluoroethyl difluoromethyl ether (HFE-236pc), 1,1,2,2-tetrafluoroethyl methyl ether (HFE-254pc), 1,1,1,2,2,3,3-heptafluoropropyl methyl ether (HFE-347mcc) or the like. Among them, at least one member selected from HFC-134a, HFC-245fa and HFC-365mfc is preferred.

The hydrocarbon compound may, for example, be butane, normal pentane, isopentane, cyclopentane, hexane, cyclohexane or the like.

Blowing agents other than water may be used singly or in combination of at least two.

The amount of water to be used as the blowing agent is preferably from 0.5 to 10 parts by mass, particularly preferably from 0.5 to 7 parts by mass, per 100 parts by mass of the composition (P).

The amount of a low-boiling fluorinated compound to be used as the blowing agent is preferably from 0 to 60 parts by mass, more preferably from 5 to 45 parts by mass, per 100 parts by mass of the composition (P). The amount of a pentane (normal pentane, isopentane and/or cyclopentane) as the blowing agent is preferably from 0.5 to 40 parts by mass, more preferably from 0.5 to 30 parts by mass, per 100 parts by mass of the composition (P).

[Foam Stabilizer]

In the present invention, a foam stabilizer is used in order to form good cells. As the foam stabilizer, a silicone-type foam stabilizer or a fluorinated compound type foam stabilizer is preferred and is commercially available. The amount of the foam stabilizer can be adjusted appropriately, but it preferably from 0.1 to 10 parts by mass per 100 parts by mass of the composition (P).

[Other Additives]

In the present invention, optional additives may be used in addition to the composition (P), the polyisocyanate compound (I), the catalyst, the blowing agent and the foam stabilizer, as the case requires. Such additives may, for example, be a filler such as calcium carbonate or barium sulfate; an anti-aging agent such as an antioxidant or an ultraviolet absorber; a flame retardant, a plasticizer, a colorant, a mildew-preventing agent, a foam breaker, a dispersing agent and a discoloration-preventing agent.

[Reaction and Foaming Step]

In the reaction foaming step, it is preferred to prepare a polyol system solution containing the composition (P) and the blowing agent and a solution containing the polyisocyanate compound (I) separately and mixing them to allow them to react. The foam stabilizer and the catalyst may be incorporated in the polyol system solution or the solution containing the polyisocyanate compound (I). However, it is preferred to incorporate the foam stabilizer and the catalyst in the polyol system solution in order to prevent separation of the polyol system solution and thereby attain stable performance.

According to the present invention, because the polyol (A) has a low viscosity, and hence the composition (P) has a low viscosity, it is possible to obtain a low-viscosity polyol system solution, for example, having a viscosity at 25° C. of at most 500 mPa·s, preferably at most 450 mPa·s, more preferably at most 400 mPa·s.

Although the lower limit of the viscosity of the polyol system solution is not particularly set, it is preferably from at least 100 mPa·s, more preferably at least 150 mPa·s, in view of the strength of the resulting foam.

The use of the low viscosity polyol system solution improves the miscibility with the polyisocyanate compound (I) and enables formation of a smoother rigid foam by spraying.

Especially, in the case of spraying, it is preferred that the difference in viscosity between the solution containing the polyisocyanate compound (I) and the polyol system solution is as low as possible in order to prevent the spray gun as the mixing device from clogging and prevent the mixing ratio from fluctuating largely. Because the preferred viscosity of the solution containing the polyisocyanate compound (I) at 25° C. is from 50 to 450 mPa·s, the polyol system solution is preferred to have a viscosity of from 50 to 450 mPa·s, too.

[Application]

The process for producing a rigid foam of the present invention is suitable for applications suited for low-viscosity polyol system solutions, especially for spraying.

In foam formation by spraying, the polyol system solution containing the composition (P), the blowing agent, the foam stabilizer, the catalyst and necessary additives is prepared, and then the polyol system solution and the solution containing the polyisocyanate compound (I) are reacted as they are sprayed onto a surface to be covered.

Since it is possible to form rigid foams by spraying directly at construction sites, spray foaming has advantages that foams are formed at lower construction cost, that the resulting foams can closely cover even irregular surfaces, and that it is possible to form multilayer rigid foams. Therefore, spray foaming is suited for building, construction and housing applications and often used to thermally insulate walls and ceilings with rigid foams. Specific examples of its applications are insulators for apartment buildings, office buildings, prefabricated cold storage warehouses, especially, the production process of the present invention is suited for heat insulation of apartment buildings, office buildings and the like.

Among various known spray foaming methods are known, particularly preferred is air-less spray foaming in which the polyol system solution and the solution containing the polyisocyanate compound (I) are mixed in the mixing head to cause foaming. The temperature of the solution mixture in the mixing head is preferably from 30 to 50° C. If the temperature of the solution mixture is too high, the resulting foam tends to contain too small cells and hence thin ribs, and tends to be weak.

The production process of the present invention is applicable to other methods than spraying, such as slab stock molding and injection molding. Especially, in injection molding into sashes of bay windows, because the polyol system solution has a low viscosity, strong and dimensionally stable rigid foams can be formed with good operability and workability.

<Rigid Foam>

A rigid foam produced by the process of the present invention preferably has a density (core density) of 15 to 40 kg/m³, more preferably from 20 to 35 kg/m³. The rigid foam density (core density) of the rigid foam can be controlled by adjusting the amount of the blowing agent and can be decreased by using a large amount of the blowing agent. However, when water is used as the blowing agent, the preferred amount of water is restricted because the miscibility of the polyol system solution with the isocyanate compound (I) has to be considered, and the polyol system solution and the isocyanate compound (I) are usually mixed in a volume ratio of 1:1 in spray foaming.

According to the present invention, by virtue of the use of the polyol (A), strong and dimensionally stable rigid foams with good moldability having a rigid foam density (core density) within the above-mentioned range can be formed with good workability.

According to the present invention, the low viscosity polyol (A) is obtained by reacting the phenol component, the aldehyde component and the alkanolamine component and then adding an alkylene oxide to the resulting reaction product by using at least 0.3 to 0.9 mol of the aldehyde component in relation to 1 mol of the phenol component, and by using the polyether polyol (A), the low-viscosity polyol composition (P) can be obtained. As a result, it is possible to prevent increase in the viscosity of the polyol system solution by the use of water as a blowing agent and attain good workability and operability. Because the difference in viscosity between the polyol system solution and the polyisocyanate compound (I) is little, the two are miscible and strong and dimensionally stable rigid foams can be obtained.

Especially, in spray foaming, since the low viscosity polyol system is sprayed in the form of a fine mist into a wide-angle mist pattern, it is easy to spray uniformly and surface smoothness improves.

Further, the polyol (A) contains a Mannich condensation product as the initiator (S1). Because Mannich condensation products contribute to improvement of flame retardancy, the use of the polyol (A) improves the resulting rigid foam. Especially, from the standpoint of prevention of a fire from welding sparks at construction sites and fire prevention as a building material, rigid foams are preferred to have excellent flame retardancy.

EXAMPLES

Now, the present invention will be described in detail with reference to Examples. However, it should be understood that the present invention is by no means restricted by these Examples. In Table 3, Examples 1 to 9 are working examples, and Examples 10 to 11 are comparative examples. The following materials were used.

[Flame Retardant]

Trischloropropyl phosphate (ICL-IP JAPAN, product name: Fyrol PCF)

[Foam stabilizer]

Silicone-type foam stabilizer (product name: SH-193, Dow Corning Toray Silicone)

[Catalyst]

Catalyst A: reactive amine blowing catalyst (product name: TOYOCAT-RX7, TOSOH CORPORATION)

Catalyst B: amine blowing catalyst (product name: TOYOCAT-TT, TOSOH CORPORATION)

Catalyst C mixture of a quaternary ammonium salt and ethylene glycol (product name: TOYOCAT-TRX, TOSOH CORPORATION)

Catalyst D: N,N',N"-tris(3-dimethylaminopropyl)hexahydro-s-triazine (product name: POLYCAT 41, Air Products and Chemicals, Inc)

Catalyst E: N,N,N'-trimethylaminoethanolamine (product name: TOYOCAT-RX5)

[Polyisocyanate Compound (I)]

Polymeric MDI (mixture of MDI and crude MDI), product name: CORONATE 1130, NIPPON POLYURETHANE INDUSTRIES., CO., LTD., viscocity at 25° C.: 130 mPa·s, Isocyanate content: 31 mass %)

<Polyols (A)>

As polyols (A) containing a Mannich condensation product, polyols A1 to A4 shown below in Table 1 were used. Polyols A3 and A4 are comparative polyols.

[Polyol A1]

Polyether polyol having a hydroxyl value of 300 mgKOH/g and a viscosity of 470 mPa·s at 25° C. (the same applies hereinafter) obtained by adding a total of 16.7 mol of alkylene oxides per 1 mol of nonylphenol in the order of EO, PO and EO in an EO/PO+EO ratio of 75 mass % by ring-opening addition polymerization, to an initiator obtained by reacting nonylphenol, formaldehyde and diethanolamine in the ratio of 1 mol:0.75 mol:2.2 mol.

[Polyol A2]

Polyether polyol having a hydroxyl value of 300 mgKOH/g and a viscosity of 470 mPa·s obtained by adding a total of 17.0 mol of the alkylene oxides per 1 mol of non-ylphenol in the order of PO and EO in an EO/PO+EO ratio of 53 mass % by ring-opening addition polymerization, to an intiator obtained by reacting nonylphenol, formaldehyde and diethanolamine in the ratio of 1 mol:0.75 mol:2.2 mol.

[Polyol A3 (Comparative Example)]

Polyether polyol having a hydroxyl value of 300 mgKOH/g and a viscosity of 1,000 mPa·s obtained by adding a total of 15.4 mol of alkylene oxides per 1 mol of nonylphenol in the order of PO and EO in an EO/PO+EO ratio of 58 mass % by ring-opening addition polymerization, to an initator obtained by reacting nonylphenol, formaldehyde and diethanolamine in the ratio of 1 mol:1.5 mol:2.2 mol.

[Polyol A4 (Comparative Example)]

Polyether polyol having a hydroxyl value of 470 mgKOH/g and a viscosity of 7,000 mPa·s obtained by adding 5.5 mol of PO per 1 mol of nonylphenol by ring-opening addition polymerization, to a Mannich compound obtained by reacting nonylphenol, formaldehyde and diethanolamine in the ratio of 1 mol:2.2 mol:2.2 mol, as the initiator.

[Monomers Having a Polymerizable Unsaturated Bond]

As the monomer having a polymerizable unsaturated bond to be used for formation of polymer particles, acrylonitrile (AN), vinyl acetate (Vac), methyl methacrylate (MMA) and a polyfluoroalkyl methacrylate (FMA) represented by the formula (1-1) were used.

As the macromonomer, the following two species were used.

Macromonomer M1: macromonomer having a polymerizable unsaturated bond and a hydroxyl value of 40 mgKOH/g by reacting the following polyol E, tolylene diisocyanate (product name: T-80, NIPPON POLYURETHANE INDUSTRY CO., LTD.) and 2-hydroxylethyl methacrylate (Junsei Chemical Co., Ltd.) in a molar ratio of 1/1/1 at 60° C. for 1 hour and then at 80° C. for 6 hours.

Macromonomer M2: macromonomer having a polymerizable unsaturated bond and a hydroxyl value of 21 mgKOH/g by reacting the following polyol F, tolylene diisocyanate (product name: T-80, NIPPON POLYURETHANE INDUSTRY CO., LTD.) and 2-hydroxylethyl methacrylate (Junsei Chemical Co., Ltd.) in a molar ratio of 1/1/1 at 60° C. for 1 hour and then at 80° C. for 6 hours.

Polyol E: polyoxyalkylene polyol having a hydroxyl value of 48 mgKOH/g and an ethylene group content of 65 mass % obtained by ring-opening addition polymerization of EO to glycerin as the initiator followed by ring-opening polymerization of a mixture of PO and EO [PO/EO=46.2/53.8 (mass ratio)].

Polyol F: polyoxyalkylene polyol having a hydroxyl value of 28 mgKOH/g and an ethylene group content of 60 mass % obtained by ring-opening addition polymerization of EO to

TABLE 1

| Composition of polyol (A) | | | | A1 | A2 | A3 | A4 |
|---|---|---|---|---|---|---|---|
| Initiator | Phenol component | Nonylphenol | [mol] | 1 | 1 | 1 | 1 |
| | Aldehyde component | Formaldehyde | [mol] | 0.75 | 0.75 | 1.5 | 2.2 |
| | Alkanolamine component | Diethanolamine | [mol] | 2.2 | 2.2 | 2.2 | 2.2 |
| Alkylene oxide | | | [mol] | 16.7 (EO/PO/EO) | 17 (PO/EO) | 15.4 (PO/EO) | 5.5 (PO) |
| Hydroxyl value of (A) | | | [mg KOH/g] | 300 | 300 | 300 | 470 |
| Viscosity of (A) (25° C.) | | | [mPa·s] | 470 | 470 | 1,000 | 7,000 |

<Polyols (C)>
[Polyol C1]

Polyester polyol having a hydroxyl value of 315 mgKOH/g and a viscosity of 2,600 mPa·s at 25° C. obtained by polycondensation of phthalic anhydride and diethylene glycol.

[Polyol C2]

Polyester polyol having a hydroxyl value of 200 mgKOH/g and a viscosity of 1,000 mPa·s at 25° C. obtained by polycondensation of a mixture of terephthalic acid and terephthalic anhydride and ether glycol (product name: PHANTOL SV-165 Hitachi Kasei Polymer Co., Ltd.)

<Polyols (D)>
[Polyol D1]

Polyether polyol having a hydroxyl value of 280 mgKOH/g and a viscosity of 11,000 mPa·s at 25° C. obtained by ring-opening addition polymerization of 4 mol of EO per 1 mol of bisphenol A as the initiator.

<Polymer-Dispersed Polyol (W)>

As the polymer-dispersed polyol (W), polymer-dispersed polyol W1 to W6 obtained as described below in Preparation Examples by using the formulations shown in Table 2. In Table 2, the ratios are indicated in "mass %".

glycerin as the initiator followed by ring-opening polymerization of a mixture of PO and EO [PO/EO=48.0/52.0 (mass ratio)].

[Base Polyol (W')]

As the base polyol (W'), a mixture the following Polyols X1, Z1 and Z2 was used.

(Polyol X1)

Polyether polyol having a hydroxyl value of 50 mgKOH/g and an EO group content of 68 mass % obtained by randomly adding EO and PO to glycerin as the initiator in the ratio of EO/PO+EO of 70 mass % by ring-opening addition polymerization.

(Polyol Z1)

Polyether polyol having a hydroxyl value of 650 mgKOH/g obtained by ring-opening addition polymerization of PO using glycerin as the initiator.

(Polyol Z2)

Polyether polyol having a hydroxyl value of 760 mgKOH/g obtained by ring-opening addition polymerization of PO using ethylenediamine as the initiator.

Preparation Example 1

Production of Polymer-Dispersed Polyol (W1)

Into a 5 L pressure reactor, the base polyol (W'), monomers and AMDN as the polymerization initiator were loaded in the ratio shown in Table 2, and the temperature was raised with stirring, and the reaction was carried out for 10 hours while the reaction solution was maintained at 80° C. The monomer conversion reached 80% or above. After completion of the reaction, the unreacted monomers were removed by 2 hours of vacuum deaeration with heating at 110° C. at 20 Pa to obtain polymer-dispersed polyol W1.

The hydroxyl value and viscosity at 25° C. of polymer-dispersed polyol W1 and the content of polymer particles in W1 are shown in Table 2 (together with those for the other two).

Preparation Examples 2 and 3

Production of Polymer-Dispersed Polyol (W2) and (W3)

Into a 5 L pressure reactor, 70 mass % of the mixture as the base polyol (W') shown in Table 2 was loaded, and a mixture of the rest of the mixture as the base polyol (W') and monomers and AMBN was fed over 2 hours with stirring while the temperature was maintained at 120° C. After completion of the feeding, stirring was continued at the same temperature for about 0.5 hour. In Preparation Examples 2 and 3, the monomer conversion reached 80% or above. After completion of the reaction, the unreacted monomers were removed by 2 hours of vacuum deaeration with heating at 120° C. at 20 Pa to obtain polymer-dispersed polyols W2 and W3.

Preparation Examples 4 to 6

Production of Polymer-Dispersed Polyols (W4), (W5) and (W6)

Into a 5 L pressure reactor, Polyol X1, Polyol Z1 and macromonomers were loaded in the ratio shown in Table 2, and while the temperature was maintained at 120° C., a mixture of monomers and a polymerization initiator (AMBN) was fed over 2 hours with stirring. After completion of the feeding, stirring was continued at the same temperature for about 0.5 hour. Then, the unreacted monomers were removed at 120° C. under reduced pressure over 3 hours to obtain polymer-dispersed polyols W4 to W6.

[Viscosities of Polyols and Polyol System Solutions]

The viscosities of polyols and polyol system solutions were measured at 25° C. in accordance with JIS K 1557-5.

Examples 1 to 11

Preparation of Rigid Foam

Rigid foams were produced from polyol system solutions and the polyisocyanate compound (I) in accordance with the formulations shown in Table 3 and evaluated by the following methods. In Table 3, the ratios are indicated in "parts by mass".

Polyol system solution were prepared by adding a catalyst, a foam stabilizer and a flame retardant to composition (P) comprising polyols (A) and (C) and polymer-dispersed polyol (W) and water as the blowing agent. Water was used alone as the blowing agent. In Table 3, the viscosities of compositions (P) (unit: mgKOH/g) and the viscosities (unit: mPa·s) of polyol system solutions at 25° C. are shown.

Polyol system solutions and polyisocyanate compound (I) were used in a volume ratio of 1/1 for production of rigid foams. The amounts (unit: parts by mass) of the polyisocyanate compound (I) used and the isocyanate indices are shown in Table 3.

<Spray Foaming Test>

Rigid polyurethane foams were produced by spraying a polyol system solution and polyisocyanate compound (I) from a Gusmer spray foaming unit (product name: FF-1600) at a discharge pressure of from 70 to 85 kg/m$^2$ at a liquid temperature of 40° C. and conducting the foaming at a room temperature of 20° C.

Spray was applied onto flexible boards measuring 600 mm long, 600 mm wide and 5 mm thick in a total of three layers, by forming a 1 mm primer layer and then two layers each having a thickness of from 25 to 30 mm. The workability, moldability and miscibility at the time of spraying and the density, compression strength, dimensional stability and flame retardancy of the resulting foams were evaluated as described below. The results of the evaluation are shown in Tables 3-1 and 3-2 (hereinafter collectively referred to as Table 3).

Evaluation Methods

[Density and Compression Strength]

The densities and compression strengths of the rigid foams were in accordance with JIS A 9526.

TABLE 2

| Preparation Example | | | 1 | 2 | 3 | 4 | 5 | 6 |
|---|---|---|---|---|---|---|---|---|
| Composition of polymer-dispersed polyol (W) | Base polyol (W') | Polyol X1 | 900 | 1,420 | 900 | 1,575 | 1,350 | 1,350 |
| | | Polyol Z1 | 900 | 830 | 1,125 | 675 | 900 | 900 |
| | | Polyol Z2 | 450 | | 225 | | | |
| | Monomer having polymerizable unsaturated bond | AN | 150 | 400 | 400 | | | 187.5 |
| | | Vac | 600 | | | 450 | 450 | |
| | | MMA | | 350 | 350 | | | |
| | | FMA | | | | 300 | 300 | 187.5 |
| | Polymerization initiator·AMBN | | 30 | 30 | 30 | 14.2 | 14.2 | 14.2 |
| | Macromonomer | Macromonomer M1 | | | | 28.5 | 28.5 | |
| | | Macromonomer M2 | | | | | | 28.5 |
| Content of polymer fine particles (mass %) | | | 25 | 25 | 25 | 20 | 20 | 10 |
| Hydroxyl value of (W) [mg KOH/g] | | | 330 | 205 | 315 | 192 | 247 | 267 |
| Viscosity of (W) (25° C.) [mPa · s] | | | 1,500 | 2,600 | 2,600 | 1,700 | 1,600 | 1,300 |
| Name | | | W1 | W2 | W3 | W4 | W5 | W6 |

[Dimensional Change (High Temperature Dimensional Stability)]

100 mm×100 mm×40 mm rectangular parallelepipeds were cut out from the foam and maintained at 70° C., and the dimensional changes perpendicular to the foam rise direction was measured after 24 hours.

[Thermal Conductivity]

Thermal conductivity (unit: W/m·K) was measured at an average temperature of 23° C. in accordance with JIS A1412-2 with a thermal conductivity tester (product name: AUTOA HC-074, EKO INSTRUMENTS CO., LTD.).

[Spray Pattern (Spray Workability)]

It was visually evaluated how much the spray mist spread as follows on a three-grade scale.

3: The mist spread at a sufficiently wide angle and formed a smooth foam surface.

2. The spread angle of the mist was slightly insufficient to form a smooth foam surface.

1. The spread angle of the mist was insufficient to foam a smooth foam surface.

[Foam Construction (Moldability)]

The edges of the resulting foams were cut, and the foam sections were evaluated on the following scale.

x (bad): There were defects such as scorch marks, cracks and non-uniform cells inside the foam.

○ (good): There were no defects such as scorch marks, cracks and non-uniform cells inside the foam.

[Miscibility]

The foam was visually observed immediately after spray foaming and rated for the uniformity of cell size and hue as follows on a three-grade scale.

3: The cell size and the hue were uniform, and there was no mixing defects.

2: The cell size was not uniform, or there were mixing defects.

1: Neither the cell size nor the hue was uniform, and there were mixing defects.

[Flame Retardancy Test]

For a flame retardancy test, the foam samples with the flexible boards obtained in the spray foaming test were cut to a thickness of 20 mm and subjected to heat release measurement using a cone calorimeter in accordance with ISO 5660.

In the results shown in Table 3, HRR indicates maximum heat release rate, and THR indicates total heat release. According to the ISO 5660 standards for flame retardant materials, samples which maintain a HRR of 200 kW/m² or above for at least 10 seconds or show a THR of 8 mL/m² or which get cracks or holes penetrating to the back detrimental to fire prevention during 5 minutes of the test are rated as unacceptable. The samples were visually examined for penetrating cracks and holes and rated as ○ (good) if no cracks or holes were observed, or as x (bad) if cracks or holes were observed.

<Simple Foaming Test>

A polyol system solution and the polyisocyanate compound were maintained at 10° C. and quickly put into a 2 L polyethylene cup and agitated at 3,000 rpm for 3 seconds to cause foaming.

The reactivity and the core density of the foam were evaluated as follows. The results are shown in Table 3.

(Evaluation Methods)

Reactivity: The time between mixing of the polyol system solution and the polyisocyanate compound at 0 seconds and the onset of a creamy appearance was defined as cream time (sec), and the time between mixing of the polyol system solution and the polyisocyanate compound at 0 second and the termination of rise of the foam due to expansion of the mixture was defined as rise time (sec).

Core density: The core of the resulting rigid polyurethane foam was cut into a 50 mm×50 mm×50 mm cube, and the density (unit: kg/m³) was calculated from the weight and the volume.

TABLE 3

|  |  |  | Ex. 1 | Ex. 2 | Ex. 3 | Ex. 4 | Ex. 5 | Ex. 6 |
|---|---|---|---|---|---|---|---|---|
| Polyol system solution | Composition (P) | Polyol A1 | 42 | 42 | 42 | 42 | 42 | 42 |
|  |  | Polyol A2 |  |  |  |  |  |  |
|  |  | Polyol A3 |  |  |  |  |  |  |
|  |  | Polyol A4 |  |  |  |  |  |  |
|  |  | Polyol C1 | 55 | 55 | 55 | 55 | 55 | 55 |
|  |  | Polyol C2 |  |  |  |  |  |  |
|  |  | Polyol D1 |  |  |  |  |  |  |
|  |  | Polyol W1 | 3 |  |  |  |  |  |
|  |  | Polyol W2 |  | 3 |  |  |  |  |
|  |  | Polyol W3 |  |  | 3 |  |  |  |
|  |  | Polyol W4 |  |  |  | 3 |  |  |
|  |  | Polyol W5 |  |  |  |  | 3 |  |
|  |  | Polyol W6 |  |  |  |  |  | 3 |
|  |  | Flame retardant | 40 | 40 | 40 | 40 | 40 | 40 |
|  |  | Foam stabilizer | 1 | 1 | 1 | 1 | 1 | 1 |
|  |  | Catalyst A | 3.0 | 3.0 | 3.0 | 3.0 | 3.0 | 3.0 |
|  |  | Catalyst B | 4.0 | 4.0 | 4.0 | 4.0 | 4.0 | 4.0 |
|  |  | Catalyst C | 5.0 | 5.0 | 5.0 | 5.0 | 5.0 | 5.0 |
|  |  | Catalyst D |  |  |  |  |  |  |
|  |  | Catalyst E |  |  |  |  |  |  |
|  |  | Water (blowing agent) | 5.0 | 5.0 | 5.0 | 5.0 | 5.0 | 5.0 |
|  |  | Overall hydroxyl value of (P) [mg KOH/g] | 309 | 309 | 309 | 305 | 307 | 307 |
|  |  | Polyol system solution viscosity [mPa·s] | 380 | 390 | 390 | 390 | 390 | 390 |
| Polyisocyanate compound (I) |  |  | 171 | 171 | 171 | 171 | 171 | 171 |
| Isocyanate index |  |  | 114 | 114 | 114 | 115 | 114 | 114 |

|  |  | Ex. 1 | Ex. 2 | Ex. 3 | Ex. 4 | Ex. 5 | Ex. 6 |
|---|---|---|---|---|---|---|---|
| Spray workability | Spray pattern (spray workability) | 3 | 3 | 3 | 3 | 3 | 3 |
|  | Foam construction (moldability) | ○ | ○ | ○ | ○ | ○ | ○ |

TABLE 3-continued

|  |  |  |  |  |  |  |  |
|---|---|---|---|---|---|---|---|
|  | Miscibility | 3 | 3 | 3 | 3 | 3 | 3 |
|  | Compression [MPa] | 0.08 | 0.09 | 0.08 | 0.08 | 0.09 | 0.07 |
|  | Dimensional change [%] | −0.7 | 0.0 | −0.8 | 0.2 | 0.3 | −0.2 |
|  | Density [kg/m$^3$] | 32.7 | 32.2 | 32.2 | 32.4 | 32.9 | 33.1 |
|  | Thermal conductivity [W/m · K] | 0.032 | — | — | — | — | — |
|  | Cone calorimeter HRR [kW/m$^2$] | 154.9 | 165.7 | 162.3 | 160.4 | 155.3 | 168.9 |
|  | (Flame retardancy test) THR [MJ/m$^2$] | 7.7 | 7.6 | 7.8 | 7.8 | 7.8 | 7.9 |
|  | Appearance | ○ Acceptable | ○ Acceptable | ○ Acceptable | ○ Acceptable | ○ Acceptable | ○ Acceptable |
| Simple foaming | Cream time [sec] | 5 | 5 | 5 | 5 | 5 | 5 |
|  | Rise time [sec] | 14 | 13 | 13 | 13 | 13 | 13 |
|  | Core density [kg/m$^3$] | 23.6 | 23.7 | 23.9 | 22.8 | 22.9 | 23.2 |

|  |  |  | Ex. 7 | Ex. 8 | Ex. 9 | Ex. 10 | Ex. 11 |
|---|---|---|---|---|---|---|---|
| Polyol system solution | Composition (P) | Polyol A1 |  | 80 | 34 |  |  |
|  |  | Polyol A2 | 42 |  |  |  |  |
|  |  | Polyol A3 |  |  | 10 | 42 |  |
|  |  | Polyol A4 |  |  |  |  | 42 |
|  |  | Polyol C1 | 55 |  |  | 55 | 55 |
|  |  | Polyol C2 |  | 17 |  |  |  |
|  |  | Polyol D1 |  |  | 50 |  |  |
|  |  | Polyol W1 | 3 | 3 | 6 | 3 | 3 |
|  |  | Polyol W2 |  |  |  |  |  |
|  |  | Polyol W3 |  |  |  |  |  |
|  |  | Polyol W4 |  |  |  |  |  |
|  |  | Polyol W5 |  |  |  |  |  |
|  |  | Polyol W6 |  |  |  |  |  |
|  | Flame retardant |  | 40 | 40 | 30 | 40 | 40 |
|  | Foam stabilizer |  | 1 | 1 | 1 | 1 | 1 |
|  | Catalyst A |  | 3.0 | 4.0 |  | 4.0 | 4.0 |
|  | Catalyst B |  | 4.0 |  |  |  | 4.0 |
|  | Catalyst C |  | 5.0 | 3.0 |  | 3.0 | 9.0 |
|  | Catalyst D |  |  | 4.0 | 4.0 | 4.0 |  |
|  | Catalyst E |  |  |  | 6.0 |  |  |
|  | Water (blowing agent) |  | 5.0 | 5.5 | 5.5 | 5.0 | 5.0 |
|  | Overall hydroxyl value of (P) |  | 309 | 288 | 251 | 309 | 381 |
|  | Polyol system solution |  | 380 | 400 | 370 | 490 | 570 |
| Polyisocyanate compound (I) |  |  | 171 | 173 | 161 | 171 | 176 |
| Isocyanate index |  |  | 114 | 114 | 112 | 114 | 105 |

|  |  | Ex. 7 | Ex. 8 | Ex. 9 | Ex. 10 | Ex. 11 |
|---|---|---|---|---|---|---|
| Spray workability | Spray pattern (spray workability) | 3 | 3 | 3 | 2 | 1 |
|  | Foam construction (moldability) | ○ | ○ | ○ | x | x |
|  | Miscibility | 3 | 3 | 3 | 2 | 1 |
|  | Compression [MPa] | 0.07 | 0.08 | 0.08 | 0.06 | 0.05 |
|  | Dimensional change [%] | −0.5 | −0.9 | −0.3 | −8.7 | −10.2 |
|  | Density [kg/m$^3$] | 32.7 | 33.5 | 29.0 | 36.4 | 37.5 |
|  | Thermal conductivity [W/m · K] | — | — | — | 0.032 | 0.032 |
|  | Cone calorimeter HRR [kW/m$^2$] | 155.9 | 167.5 | 160.1 | 162.3 | 168.9 |
|  | (Flame retardancy test) THR [MJ/m$^2$] | 7.8 | 7.9 | 7.2 | 7.9 | 7.7 |
|  | Appearance | ○ Acceptable | ○ Acceptable | ○ Acceptable | ○ Acceptable | ○ Acceptable |
| Simple foaming | Cream time [sec] | 5 | 5 | 5 | 5 | 4 |
|  | Rise time [sec] | 13 | 13 | 12 | 14 | 12 |
|  | Core density [kg/m$^3$] | 23.4 | 24.3 | 20.4 | 24.1 | 24.8 |

The results shown in Table 3 indicate that in Examples 1-9, though water was used alone as the blowing agent, the polyol system solutions had low viscosities, and spray workability, moldability and miscibility at the time of spray foaming were good. The resulting rigid foams, though having low densities, were excellent in compression strength, dimensional stability and flame retardancy. Furthermore, excellent foams with low densities were also obtained by simple foaming.

In contrast, in Examples 10 and 11, because the polyols (A) were obtained by using intiators (S1) obtained by reacting from 1.5 to 2.2 mol of an aldehyde component per 1 mol of an phenol component, the polyols (A) and the polyol system solutions obtained therefrom had high viscosities and hence showed poor miscibility with the polyisocyanate compound (I), and spray workability was poor. The cells in the resulting rigid foams were not uniform, and the foams were low compression strengths and poor dimensional stability.

INDUSTRIAL APPLICABILITY

The polyether polyol (A) produced by the process of the present invention can be used as a raw material for rigid polyurethane foams and rigid polyisocyanuate foams. The rigid polyurethane foams and rigid polyisocyanuate foams produced according to the present invention can be used as heat insulators for various instruments and buildings.

This application is a continuation of PCT Application No. PCT/JP2010/060058 filed on Jun. 14, 2010, which is based upon and claims the benefit of priority from Japanese Patent Application No. 2009-143114 filed on Jun. 16, 2009. The contents of those applications are incorporated herein by reference in its entirety.

What is claimed is:

1. A process for producing a polyether polyol (A) comprising reacting the following phenol component, the following aldehyde component and the following alkanolamine component thereby forming a reaction product, and reacting an alkylene oxide with the reaction product, wherein the aldehyde component is used in an amount of at least 0.3 mol and less than 0.8 mol, and the alkanolamine component is used in an amount of at least 1.5 mol and at most 3.5 mol, in relation to 1 mol of the phenol component:

Phenol component: at least one member selected from the group consisting of phenol and phenol derivatives having a hydrogen atom at one or more ortho-positions to the phenolic hydroxyl group;

Aldehyde component: at least one member selected from the group consisting of formaldehyde and acetoaldehyde;

Alkanolamine component: at least one member selected from the group consisting of monoethanolamine, diethanolamine and 1-amino-2-propanol.

2. The process for producing a polyether polyol (A) according to claim 1, wherein the phenol component is at least one member selected from alkylphenols having a hydrogen atom at one or more ortho-positions to the phenolic hydroxyl group and at least one aromatic hydrogen atom substituted by a $C_{1-15}$ alkyl group.

3. The process for producing a polyether polyol (A) according to claim 1, wherein the alkylene oxide is at least one member selected from ethylene oxide, propylene oxide and butylenes oxide.

4. The process for producing a polyether polyol (A) according to claim 1, wherein the polyether polyol (A) has a hydroxyl value of from 200 to 800 mgKOH/g.

5. The process for producing a polyether polyol (A) according to claim 1, wherein the aldehyde component is used in an amount of at least 0.4 mol and less than 0.8 mol, in relation to 1 mol of the phenol component.

6. The process for producing a polyether polyol (A) according to claim 1, wherein the alkanolamine component is used in an amount of at least 2 mol and at most 3.5 mol, in relation to 1 mol of the phenol component.

7. The process for producing a polyether polyol (A) according to claim 1, wherein the phenol component comprises nonylphenol or cresol, the aldehyde component comprises formaldehyde and the alkanolamine component comprises diethanolamine.

8. The process for producing a polyether polyol (A) according to claim 5, wherein the phenol component comprises nonylphenol or cresol, the aldehyde component comprises formaldehyde and the alkanolamine component comprises diethanolamine.

9. The process for producing a polyether polyol (A) according to claim 6, wherein the phenol component comprises nonylphenol or cresol, the aldehyde component comprises formaldehyde and the alkanolamine component comprises diethanolamine.

10. A process for producing a rigid foamed synthetic resin by reacting a polyol composition (P), a polyisocyanate compound (I) in the presence of a blowing agent, a foam stabilizer and a catalyst, which is characterized in that the polyol composition (P) comprises a polyether polyol (A) obtained by the process as defined in claim 1.

11. The process for producing a rigid foamed synthetic resin according to claim 10, wherein water is used solely as the blowing agent.

12. The process for producing a rigid foamed synthetic resin according to claim 10, wherein the polyol composition (P) contains a polymer-dispersed polyol (W).

13. The process for producing a rigid foamed synthetic resin according to claim 12, wherein the polymer-dispersed polyol (W) has a hydroxyl value of from 100 to 800 mgKOH/g.

14. The process for producing a rigid foamed synthetic resin according to claim 10, wherein spraying is used.

* * * * *